March 8, 1938. A. A. A. ROSSIGNOL ET AL 2,110,529
SOLDERING OR WELDING MACHINE
Filed Nov. 1, 1933 8 Sheets-Sheet 4

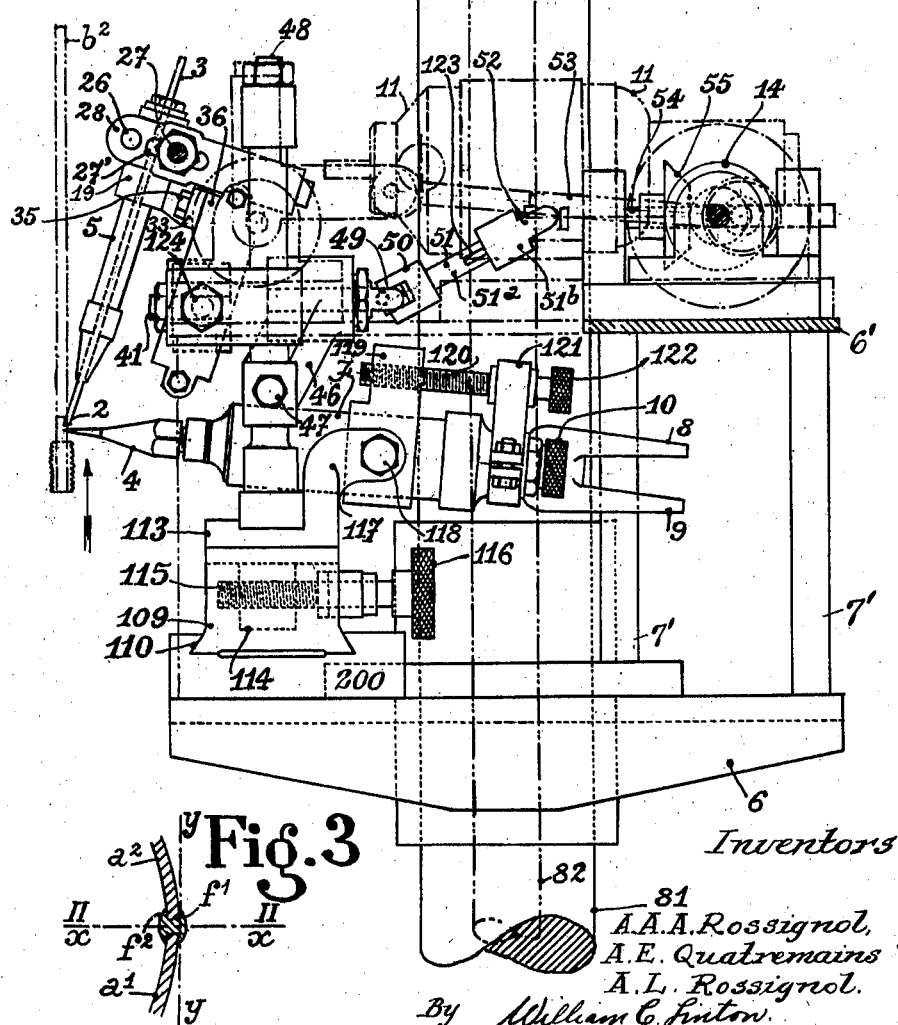

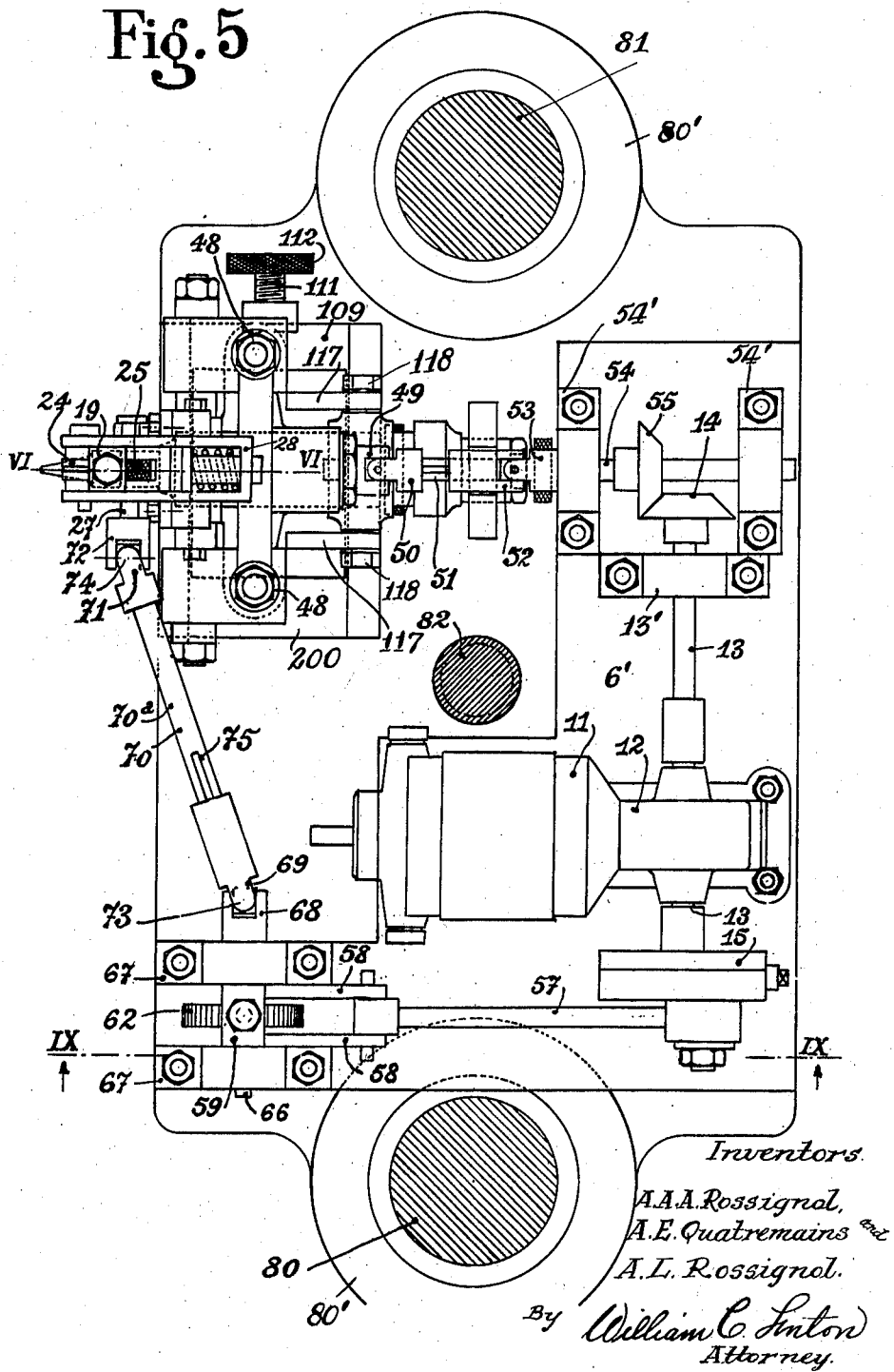

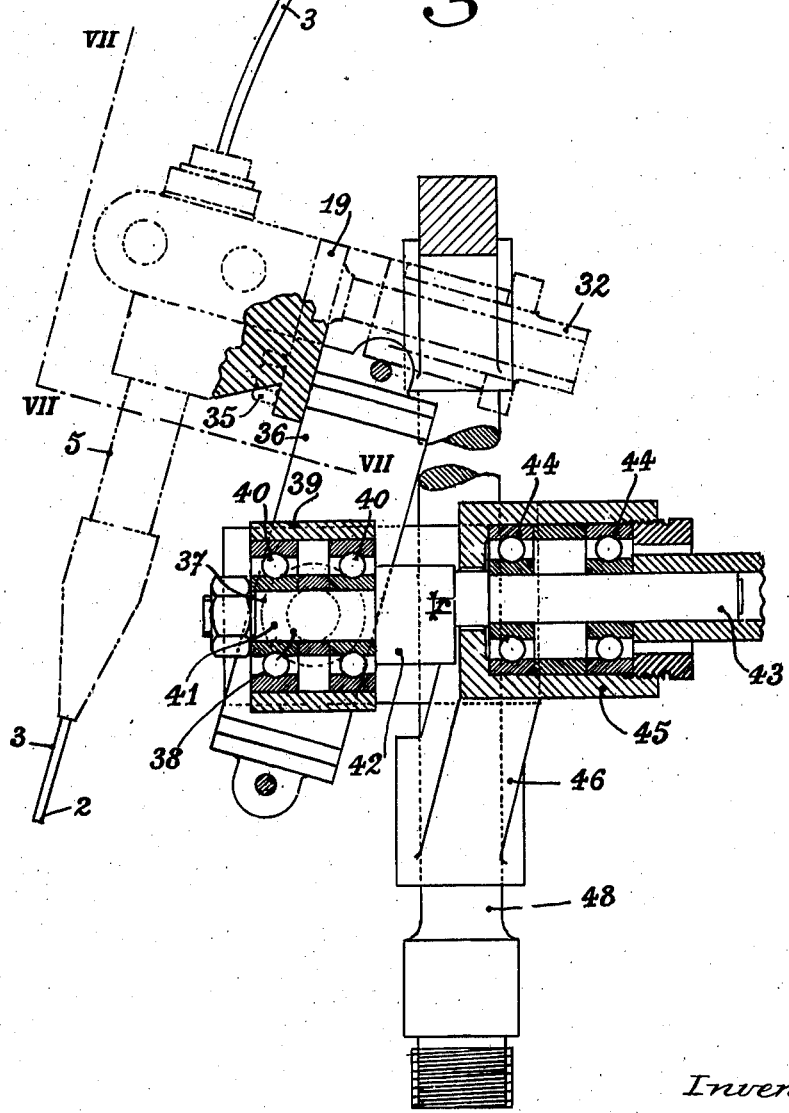

Inventors
A.A.A.Rossignol; A.E.Quatremains & A.L.Rossignol.
By William C. Linton
Attorney March 8, 1938.　　A. A. A. ROSSIGNOL ET AL　　2,110,529
SOLDERING OR WELDING MACHINE
Filed Nov. 1, 1933　　8 Sheets-Sheet 5

Inventors
A.A.A. Rossignol
A.E. Quatremains and
A.L. Rossignol
By William C. Linton
Attorney.

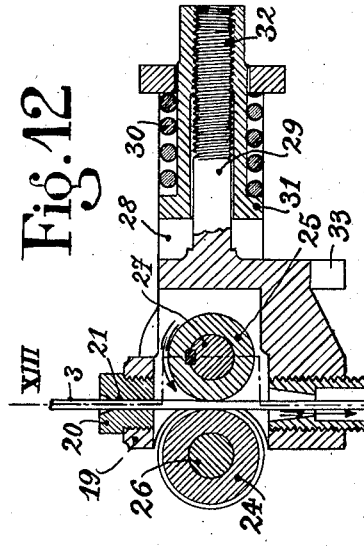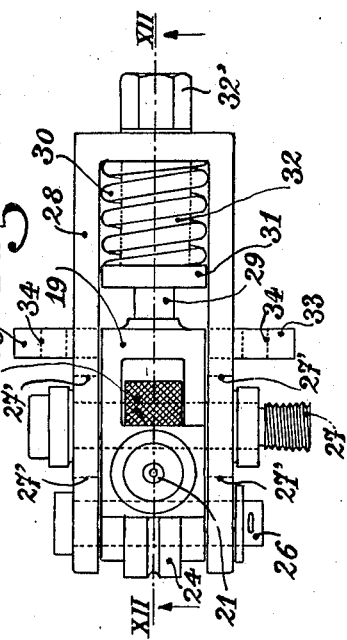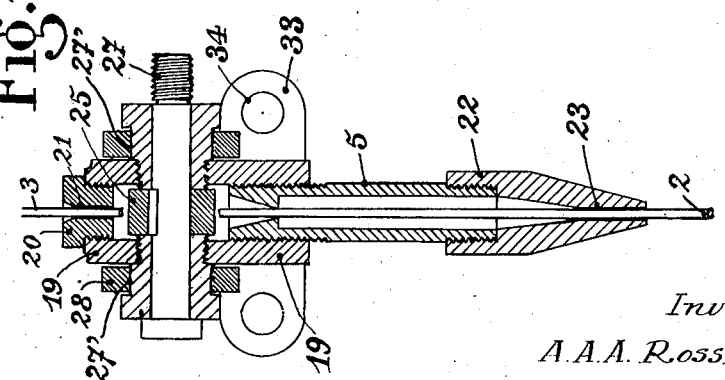

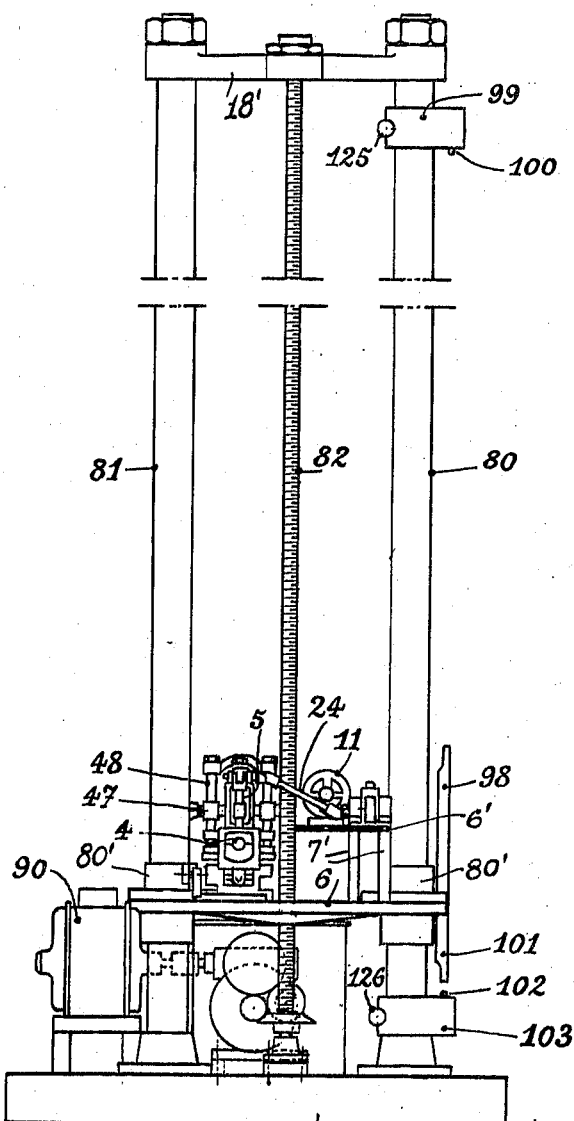

Patented Mar. 8, 1938

2,110,529

UNITED STATES PATENT OFFICE 2,110,529

SOLDERING OR WELDING MACHINE

Alfred Auguste Adolphe Rossignol, Alexis Eugène Quatremains, and Auguste Louis Rossignol, Asnieres, France Application November 1, 1933, Serial No. 696,278 In France June 30, 1933

12 Claims. (Cl. 113—59)

The present invention relates to an apparatus for the soldering or welding of metallic elements and more especially to apparatuses for effecting double thickness joining, that is to say, joints having an extra overthickness on each face of the metallic elements or work to be joined, having amongst its principal objects the provision of a machine whereby the autogenous welding or soldering operations may be automatically, progressively and continuously performed.

Other objects of the invention will be in part obvious and in part pointed out hereinafter.

The automatic soldering or welding machine embodying the present invention for soldering or welding metallic elements along their edges separated from each other by a gap and presented vertically in the part of the said edges which is submitted to the soldering or welding operation includes the use in combination of a piece-holder for carrying an auxiliary soldering or welding piece, such as a wire, the said piece-holder (which, for the remainder of the specification will be hereinafter called a "wire-holder", it being understood that the said expression includes also, in the specification and claims, any holder for an auxiliary soldering or welding piece other than a wire) being arranged above a blow-pipe or welding torch, means for producing a relative movement between the blow-pipe and the auxiliary soldering or welding piece, a common member for supporting the blow-pipe and means for producing a relative movement between the said common supporting member and the parts of the edges of the elements which are, at that time, submitted to the soldering or welding operation, this relative movement being executed in the direction corresponding to the progress of the soldering or welding; so, a double overthickness soldering or welding, i. e. a soldering or welding with an overthickness on each face of the soldered or welded elements is obtained.

Numerous machines may be constructed in accordance with this principle.

In the drawings:—

Figure 1 shows in front elevation a double overthickness weld, made in an upward direction, carried out by the means above defined, and in which the path of the end of the welding wire in relation to a point of the flame of the blow-pipe is shown.

Figure 2 is a section of this welding on the line II—II of Fig. 3.

Figure 3 is a section on the line III—III of Figure 1.

Figures 4 to 14 show, on different scales, the various elements of the machine.

Figure 4 is an elevation of the common platform for supporting the blow-pipe and the wire-holder and their operating and adjusting mechanisms, certain parts being omitted from the figure for the sake of clearness.

Figure 5 is a plan of the same platform and the parts mounted therein.

Figure 6 shows on a larger scale, partly in vertical section on the line VI—VI of Figure 5, and partly in elevation the means for effecting the circular movement of the wire-holder.

Figure 7 shows, partly in vertical section on the line VII—VII of Fig. 6 and partly in elevation, a part of the mechanism for effecting the circular movement of the wire-holder.

Figure 8 is a horizontal section of the crank-pin for driving the wire-holder and the guide ways of the latter, this section being taken on the line VIII—VIII of Fig. 7.

Figure 9 shows, partly in elevation and partly in section on the line IX—IX of Fig. 5, and looked at in the direction of the arrows the mechanism for feeding the soldering or welding wire.

Figure 10 is a view, partly in plan and partly in section, of the parts shown in Fig. 9.

Figure 11 shows on a larger scale and in plan view a part of the feeding mechanism for the soldering or welding wire.

Figure 12 shows the same part of this mechanism, seen in section on the line XII—XII of Fig. 11.

Figure 13 is a section, on the same scale, taken on the line XIII—XIII of Fig. 12.

Figure 14 is a general view, in side elevation, of a soldering or welding machine, provided with the arrangements illustrated in Figs. 4 to 12.

Figure 15 is a front elevation of the same machine.

Figure 7:
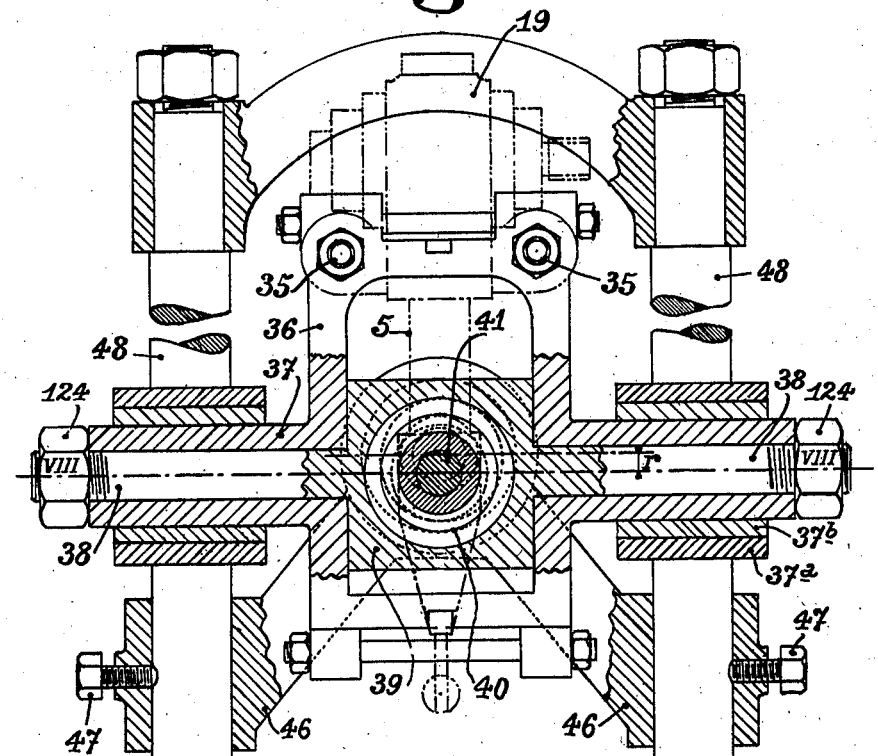
Figure 8:
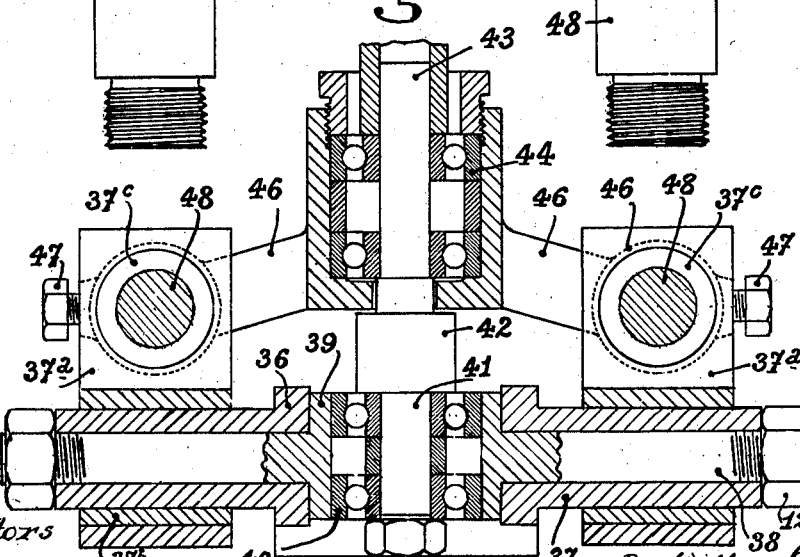

Referring now more particularly to the accompanying drawings wherein like and corresponding parts are designated by similar reference characters throughout the several views, we have herein shown a soldering and welding machine comprising a base 18 having permanently mounted thereupon a pair of spaced columns 80 and 81, which columns are connected at their upper ends by means of a brace bar 18'. Slidably mounted upon each column 80 and 81 is a sleeve 80' which supports and guides a platform 6. This platform has a superstructure arranged thereupon consisting of a plate 6' of substantially an L-shaped configuration in plan view as is better illustrated in Figure 5 and which plate is supported upon the platform 6 by means of the standards 7'. Journalled within suitable bearings mounted within the base 18 and the brace bar 18' is a screw 82 which extends through an internally threaded opening formed within the platform 6 whereby upon rotation of this screw 82 the platform 6 and its superstructure will be caused to be raised and lowered. Adjustably mounted upon the platform 6 are a blow-pipe 4 and a wire-holder 5. The wire-holder and blow-pipe may be jointly adjusted to and from and longitudinally with respect to the work to be welded, and further, the blow-pipe and wire-holder may be independently adjusted with respect to one another in order that they may be properly set to meet the various welding conditions. In order that the wire-holder may receive the desired circular motion and be applied with power operable means for driving the wire feeding mechanism carried thereby, a motor 11 is mounted upon the superstructure of the movable platform 6 and this motor is adjustably and flexibly connected to the wire-holder and its feeding mechanism.

Also mounted upon the base 18 of the machine in front of and spaced from the columns 80 and 81 is a vertical guide 79 which consists of a pair of spaced columns connected at their upper ends by means of the bracket 79' to the cross bar 18'. Slidably mounted upon this vertical guide is a pair of sleeves carrying a work-holder consisting of the members 76 and 77. This work-holder may be so arranged as to permit the work which is herein illustrated as a cylinder $h$ to be supported upon the lower member 76 and the upper member 77 of the work-holder may engage over the upper edge of the cylinder $h$ in order to retain this cylinder in the proper position with respect to the blow-pipe or welding torch and the wire-holder 5.

In Figures 1, 2 and 3, $a'$ and $a^2$ are the two elements to be welded along their edges opposite $b'$ and $b^2$; these edges being separated from each other by a gap $c$ of a width $d$. $x$—$x$ indicates the axis of the blow-pipe flame. 1 is the point at which this axis meets the common plane $y$—$y$ of the front faces of the elements $a'$ and $a^2$ to be welded together. 2 is the end of the welding wire 3. The flame of the blow-pipe is sufficiently strong to ensure the fusion over the entire width of the edges $b'$ and $b^2$ of the elements to be welded, producing momentarily, by local melting of the edges of the elements, embayments, $e'$ and $e^2$; the metal due to the melting of these two edges flows by gravity and collects below the flame in the gap $c$ existing between the two edges. The end 2 of the welding wire receives a circular movement of radius $r$ about the point 1 of the blow-pipe flame. Under these conditions, the melted soldering metal also falls into the same gap $c$, distributes itself in suitable manner in this gap and fills it, the total mass of fused metal producing, on solidifying, slight projections $f'$ and $f^2$ on the two faces of the welded elements.

Blow-pipe

In Figure 4 and succeeding figures, the blow-pipe 4 and the support 5 for the soldering or welding wire 3 are provided by a common support adjustably mounted upon the platform 6 whereby they may be jointly moved with respect to the elements $a'$ and $a^2$ to be soldered or welded in such a manner as to enable the edges $b'$ $b^2$ to be acted upon successively at all points of the length on which they are to be connected. The projections $f'$, $f^2$ renewed at each rotation of the soldering or welding wire in relation to the elements to be soldered or welded form very regular overthickness or strings $g'$, $g^2$ on the faces of these elements, so that the resistance of the soldered or welded joint thus obtained to mechanical stresses is constant from one extremity to the other, a result not obtained when the soldering or welding is done by hand.

The wire holder 5 presents the end 2 of the soldering or welding wire 3 in the desired position relative to the elements to be soldered or welded and to the flame emerging from the blow-pipe 4. The blowpipe 4 has its body 7 provided with a pipe connection 8 for the supply of the hydrogen or other combustible gas, and a pipe connection 9 for the gas or oxygen. Each of these pipe connections is connected in the usual way by a flexible pipe (not shown) to a reservoir containing these fluids under pressure.

The flame is regulated by any known or suitable manipulating means, for instance by a knurled head 10.

On the plate 6' supported by the platform 6 is mounted a motor 11 for simultaneously driving the mechanism which transmits a circular movement of the wire-holder and the mechanism for feeding the wire through this wire-holder. In this case, the motor 11 is an electric motor. By the intermediary of a speed-reducing gear of any type contained in a casing 12, this motor drives a shaft 13. This shaft carries at one end a pinion 14 for the mechanism which transmits a circular movement of the wire-holder, and at its opposite end a disc 15 for driving the mechanism which feeds the wire to the elements to be soldered or welded.

The wire intended to be fed to the holder 5 by the machine is preferably a loose coil 16 (Figure 14) wound upon a shaft 16' carried by the bracket 17 mounted on the plate 6' of the movable carrier.

Wire-holder

Referring to Figs. 11–13, the wire-holder comprises in its upper part a suspension head 19 having a plug 20 provided with a passage 21 that acts as upper guide for the wire 3, and at its lower end a conical sleeve 22 traversed by a passage 23 that acts as a lower guide for the wire. When the head 19 is mounted on the machine (Fig. 4) the axis of the wire-holder is suitably inclined in relation to the elements to be soldered or welded and to the axis $x$—$x$ of the blow-pipe.

The wire coming from the bobbin 16 passes through the wire-holder between two grooved rollers 24 and 25, one of which, 24 is loose on its shaft 26, whilst the other roller 25 is keyed to a driving shaft 27 for the wire 3. This shaft is driven by the motor 11 in the manner hereafter described. The roller 24 is carried by a bracket 28 mounted on a stem 29 of the head 19. The shaft 26 is journalled in bearings carried by the outer ends of the bracket 28, whilst the shaft 27 of the roller 25 is carried by the bracket 19 and passes through the elongated slots 27' formed in the opposed branches of the bracket 28. A spring 30 is interposed between a collar 31 slidable upon the stem 29 and the bracket 28, and its pressure may be controlled at will by any suitable means, or a sleeve 32 integral with the collar 31. This sleeve is internally threaded, screwed on the rod 29 and movable along this rod by acting with a spanner or key on its polygonal head 32'. By means of this spring a suitable pressure can be exerted on the wire 3 in order that the driven roller 25 may have gripping contact therewith.

*Mechanism for the circular movement of the wire-holder (Figs. 4 to 8)*

The head 19 of the wire-holder 5 is provided with winged projections 33 each having an opening 34 formed therein (Figure 13) through which extend the screws or bolts 35 for attaching the work-holder to the frame 36 as is better illustrated in Figure 7. This frame 36 has formed therewith laterally projecting and hollow trunnions 37 through which project the stub shafts 38 carried by a bearing block 39. Mounted within this bearing block 39 is a ball bearing 40 consisting of two raceways and in this ball bearing 40 is journalled a pin 41, as shown in Figure 6. This pin 41 is eccentrically mounted upon and projects from a disc 42 keyed to the shaft 43. Detachably mounted upon the carrier 6 is a pair of spaced pillars 48 each having adjustably mounted thereupon a sleeve forming part of the bracket 46. This bracket 46 is retained in its desired adjusted position by the set screws 47. This bracket 46 is provided with a sleeve or bearing block 45 in which are arranged ball bearing raceways 44 and journalled within these ball bearing raceways is the shaft 43.

The end of the shaft 43 opposite the pin 41 is connected by a universal joint 49, 50 (Figs. 4 and 5) to an intermediate shaft 51. This shaft 51 is connected at its opposite end, by means of a second universal joint 52—53, to the driving shaft 54, having keyed thereto a bevel-wheel 55 in mesh with the bevel-wheel 14 (Figs. 4 and 5). Mounted upon the plate 6' of the movable carrier is a pair of spaced bearing blocks 54' in which is journalled the shaft 54 and also arranged upon this plate 6' is a bearing block 13' which supports one end of the driven shaft 13.

As the motor 11 drives the shaft 13, the bevel-wheel 14 drives the bevel-wheel 55 and consequently the shafts 54, 51, 43 communicate to the pin 41 a circular movement. Consequently, all the parts carried by the pin 41, that is, the frame 36, head 19 of the wire-holder 5, and the wire-holder 5 receive this same circular movement. The end 2 of the wire 3 carried by the wire-holder 5 therefore also describes a circular movement of radius r.

*Arrangement for guiding the wire-holder (Figs. 6 to 8)*

As heretofore stated, the wire-holder 5 is preferably provided with a guiding arrangement intended to maintain the varying positions of its axis parallel with one another during its circular movement. This guiding arrangement is made possible by two identical brackets 37ª mounted on the hollow trunnions 37. Each of these brackets has a horizontal sleeve 37ᵇ in which the corresponding trunnion 37 slides horizontally during each revolution of the pin 41, and each bracket has a vertical sleve 37ᶜ by which it is mounted on the corresponding pillar 48, along which it slides during each revolution of the same pin 41. In this way the horizontal and vertical movements of the wire-holder may be freely performed during the rotation of the pin 41, and the axis t—t always moves in the same plane.

*Mechanism for feeding the soldering or welding wire (Figs. 9 and 10)*

Figures 9, 10:
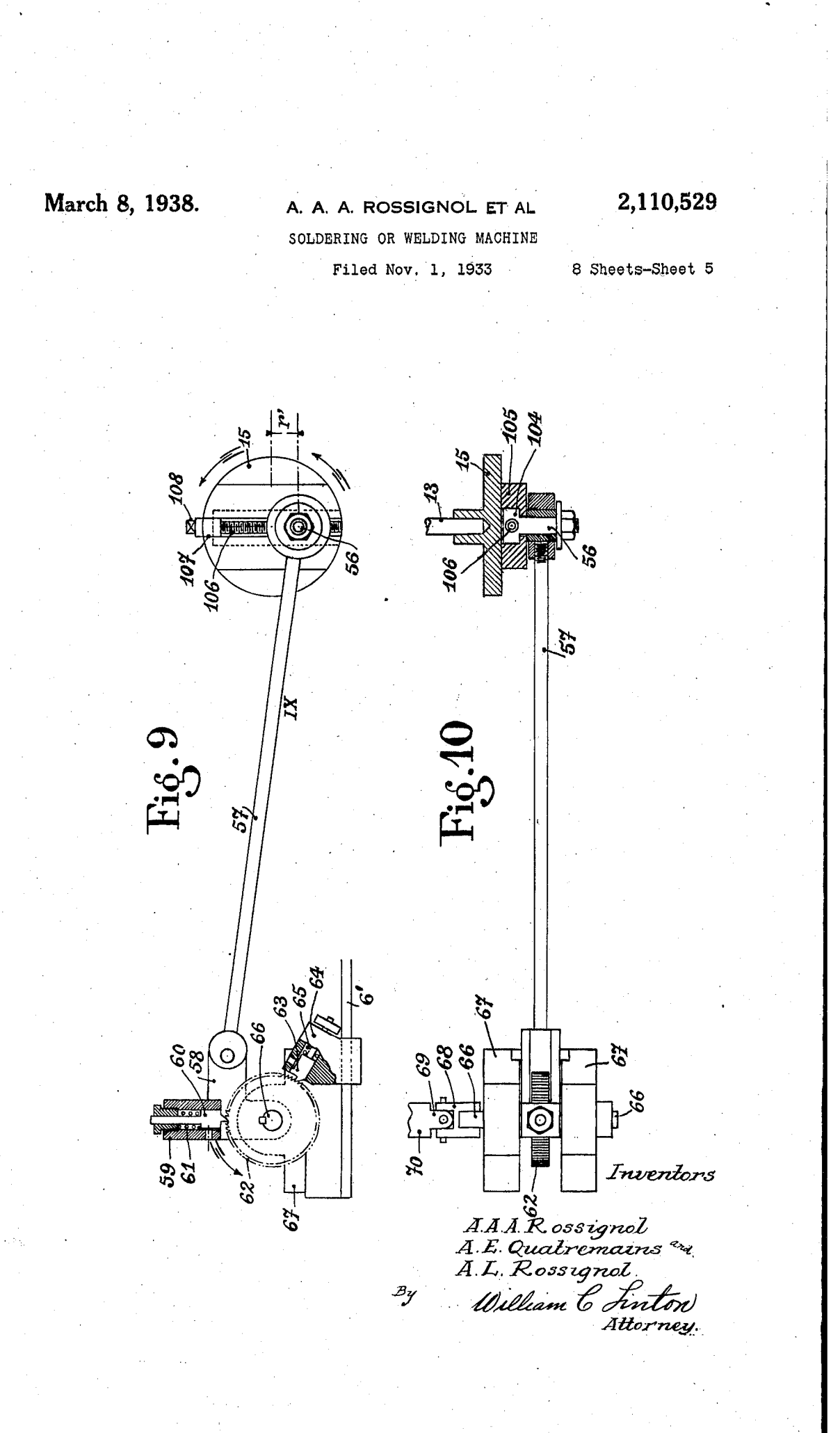

On the driving plate 15 of the mechanism for feeding the soldering or welding wire is adjustably mounted a crank-pin 56 (Figs. 9 and 10), carrying a connecting rod 57, the head 58 of which carries a sleeve 59 containing a pawl 60, controlled by a spring 61. The pawl 60 is in engagement with a toothed wheel 62 whose teeth have an inclination suitable for the movement to be produced. A second pawl 63, mounted in a fixed block 64, and constantly urged forward by a spring 65, is in engagement with the toothed wheel 62. At each revolution of the plate 15 in the direction of the arrow as shown in Figure 9, the toothed wheel 62 is consequently moved the fraction of a revolution in the direction of the arrow adjacent this wheel 62 in Fig. 9. This toothed wheel 62 drives a shaft 66, mounted in bearing blocks 67, carried by the plate 6' and connected by a Cardan joint 68, 69 to an intermediate shaft 70. This shaft 70 is connected at its opposite end by a Cardan joint 71—72 to the shaft 27 that drives the roller 25 for feeding the wire 2 (Fig. 5).

As the axis of the shaft 27 describes in space a circle, whilst the axis of the shaft 66 is fixed, the axis of the shaft 70 describes a cone the apex of which is the meeting point 73 of the axes of the shaft 70 and shaft 66 and the base of which is the circumference described by the meeting point 74 of the axes of the shaft 70 and shaft 27. In this movement the distance between the points 73, 74 constantly varies; for this reason, the shaft 70 is made telescopic and formed of two parts 70ª, 70ᵇ movable one in the other. A longitudinal key 75 enables the two parts to rotate solidly together.

*Arrangement for the relative movement of the soldering or welding wire and the blowpipe relative to the elements to be soldered or welded*

As has been stated, a relative movement is produced between the blow-pipe and the elements to be soldered or welded.

When the said elements have their edges straight like the edges b'—b² in Figs. 1-3, the soldering or welding is done in an upward direction, that is to say, starting from the bottom of these edges and working to their top. For that purpose, the elements to be soldered or welded which may belong to the same piece, for instance, a sheet h rolled into a cylinder, may be arranged between the members 76 and 77 illustrated in Figure 14.

The lower edge of the sheet metal cylinder h to be soldered or welded along its edges b' and b² of its elements a' and a² is mounted on the support 76. The upper supporting member 77 has a V-shaped groove formed in its lower face which engages over the upper edge h' of this cylinder h and holds it in position upon the lower supporting members 76. This retaining member 77 is adjustable vertically, for instance, by means of a hand-wheel 78, and each of these parts 76, 77 is further adjustable along vertical guides 79 mounted on the base 18.

The platform 6 is movable in a vertical direction along the two guiding columns 80 and 81 placed on each side of the screw-thread rod 82. This rod passes through the platform 6, which forms a non-rotatable nut and carries at its bottom end a bevel-wheel 83 in mesh with a bevel pinion 84. This pinion is driven by a reducing train of gearing in a casing 85 and placed under the control of a lever 86. This gear train is actuated by a toothed wheel 87 in mesh with the pinion 88 of a speed-reducer 89 arranged in a casing and driven by the motor 90 fed by the same source of current as the motor 11 or by a similar source so as to rotate in synchronism with the motor 11.

The whole is regulated in such manner that the platform 6 moves in relation to the elements to be soldered or welded at the speed necessary for doing the soldering or welding by means of the blow-pipe 4 and the soldering or welding wire 3.

The machine may also be provided with means for performing soldering or welding in curves; for example, to solder or weld a cylinder bottom on the cylinder $h$ aforesaid and which has been soldered or welded longitudinally by the means above described, the bottom and the cylinder are held rigidly together in the usual way by tack welding distributed over their circular opposite edges leaving between these edges the gap $c$ necessary for performing the double thickness soldering or welding, then the whole formed by this cylinder and bottom is fixed in a frame, not shown in the drawings.

Figure 14:
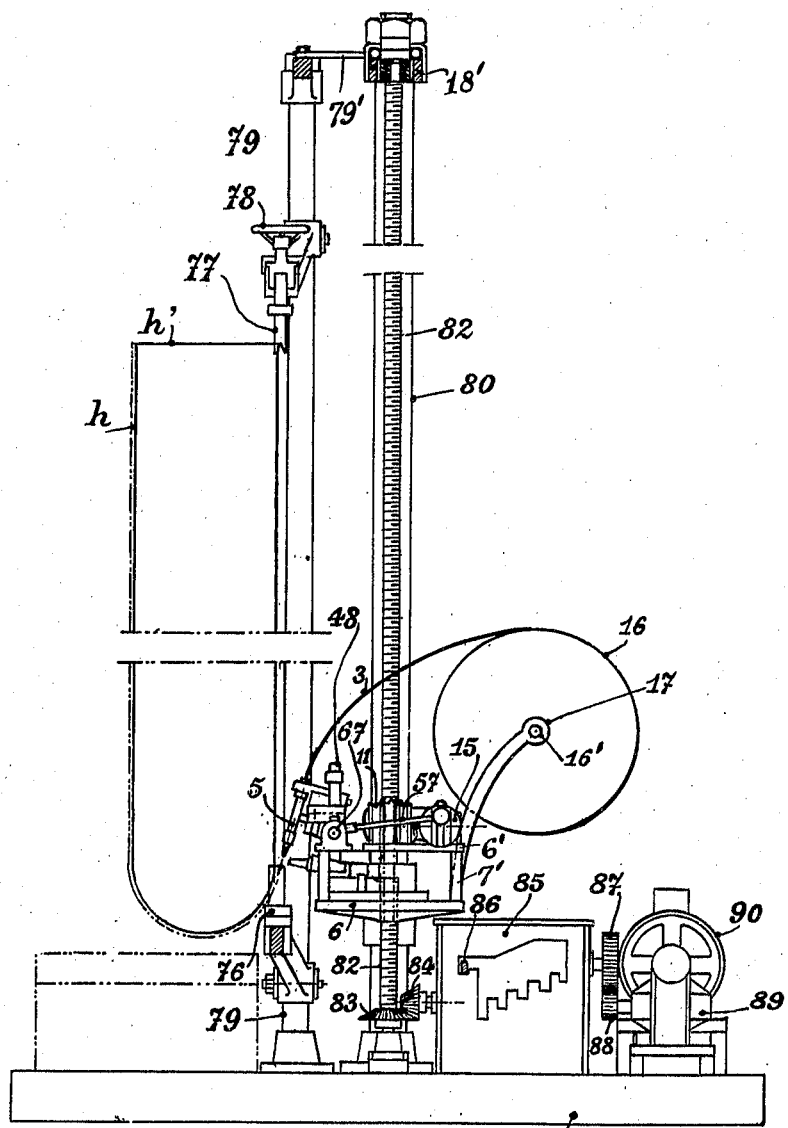

In case rectilinear soldering or welding is being done, the machine shown in Figs. 14 and 15 may be automatically stopped at the end of each soldering or welding operation. For this purpose, the moving platform 6 carries a stop 98 operating a contact 99 which controls switches for stopping the motors 11 and 90. When the soldering or welding has been done to the desired height, this stop 98 actuates a part 100 of the contact 99 which controls a switch for stopping a motor 90 and another switch for stopping the motor 11, the machine therefore stops. The operator then puts the lever 86 in the position for the quick return of the platform 6, then by means of the switch controlling the motor 90 he starts the said motor 90 alone and the platform 6 returns quickly to its starting position. Obviously instead of this arrangement any known automatic quick return device may also be applied on the machine for obtaining automatically the quick return of the platform 6. At the end of this return movement a second stop 101 mounted on the platform 6 strikes the piece 102 of the second contact 103 arranged on the lower part of the machine. This contact causes the stoppage of the motor 90. Each of these contacts 99 and 103 may be carried by one of the pillars of the machine, the pillar 80 for instance.

*Adjusting arrangements*

As heretofore stated, the machine is provided with various adjusting devices for various purposes. Thus 1. The radius $r$ of the circle described by the end of the soldering or welding wire may be varied when necessary by simply dismounting the piece 43, 42, 41 and replacing it by another in which the distance $r$ between the axes described by the lines $u$—$u$, $v$—$v$ has the new value desired.

2. The speed of feed of the soldering or welding wire may similarly be adjusted to any desired value. For this purpose, the radius $r'$ of eccentricity of the crank-pin 56 is adjustable. To this end, the pin 56 is carried by a slide 104 movably mounted within the guide 105 carried by the disc 15. This slide 104 forms a non-rotatable nut on a threaded rod 106 loose in a block 107 connected to the disc 15. This rod may be rotated about its axis by turning its head 108.

3. Mounted upon the platform 6 is a block 200 in the upper face of which is formed a groove 110 and slideably mounted within the groove is a carriage 109. Suitably mounted within this block 200 is a screw 111 which is connected to this carriage 109 and this screw is provided with a knurled head 112 whereby upon manually rotating this screw 111 the carriage 109 will be caused to slide upon the block 200 and in this manner, the blow pipe and the wire-holder may be simultaneously laterally adjusted with regards to the seam to be soldered or welded. The axis of this adjusting screw 111 is disposed parallel to the plane of the edges $b'$ and $b^2$ of the elements to be soldered or welded.

4. The carriage 109 has slidably mounted thereupon a second carriage 113 and this latter carriage is provided with a depending projection 114. Journalled within suitable bearings carried by the carriage 109 is a threaded rod 115 having a knurled head 116 and this rod has engagement with the projection 114 whereupon with the rotation of this rod 115 the carriage 113 will be caused to travel in a lateral direction with respect to the carriage 109. The axis of this threaded rod is arranged transversely to the plane formed by the edges $b'$, $b^2$ of the elements to be soldered or welded. By manipulating the screw 115, the distance between the blow-pipe and the wire-holder 5 may be adjusted in relation to these edges $b'$, $b^2$.

5. An arrangement for adjusting the distance of the blow-pipe 4 in relation to the elements to be soldered or welded and independently of the soldering or welding wire may be provided. This arrangement is here formed by a sleeve 119, carried by the carriage 113 and a threaded rod 120 screwed in this sleeve 119 and carried by a collar 121 fixed to the body 7 of the blow-pipe. This screw 120 is operated by a knurled head 122 on the screw 120.

6. An arrangement for adjusting the inclination of the axis of the blow-pipe in regard to the elements to be soldered or welded is here formed by bearings 117 mounted on the carriage 113 and supporting screw trunnions 118 mounted on the sleeve for supporting the body 7 of the blow-pipe. These trunnions may be adjusted about their axis into any desired position on the bearings 117 by means of their hexagonal heads. In this way, the axis $x$—$x$ of the blow-pipe may be inclined in any desired angle in relation to the horizontal without the wire-holder 5 participating in this movement.

7. The wire-holder 5 may be provided with an arrangement which enables its vertical distance relative to the blow-pipe to be adjusted. This vertical adjusting arrangement is here formed by the bracket 46, which may be adjusted to any desired height on the pillars 48 by means of locking means 47 made in the form of bolts.

In cases where the wire-holder 5 is thus adjustable in height, the intermediate shaft 51 is made telescopic like the shaft 70, and may then comprise elements $51a$, $51b$ similar to the elements $70^a$ and $70^b$ and a key 123 similar to the key 75 for the rotary connection between these elements.

8. Means for adjusting the inclination of the wire-holder in relation to the elements to be soldered or welded are also provided. In this case these means are arranged in the following manner:

On the trunnions 38 of the bearing block 39 circularly driven by the crank-pin 41 are loosely mounted bearings 37 fixed to the frame 36 of the head 19 of the wire-holder; the said bearings 37 are adjustable about their axis on the trunnions 38 which cannot rotate about their axis by reason of the arrangement of the block 39 on the crank-pin 41 of the driving shaft 43. The bearings 37 are locked on the trunnions 38 in any desired position by means of the nuts 124 mounted on the threaded ends of the journals 38.

9. The extent of the movement of the movable platform 6 and also the points of starting and stoppage of this movement are also controllable at will by means of the contacts 99, 103, which are mounted so as to be movable along the pillar 80, each of these contacts being capable of being fixed at any desired point on this pillar by means of a locking screw; screw 125 for the contact 99 and 126 for the contact 103.

It is to be understood that the machine above described is given only by way of example, and numerous modifications may be made in it without departing from the scope of the present invention. Similarly, the soldering or welding material, instead of being in the form of wire, might be in any other form such as rods, sheets and the like.

Having now particularly described and ascertained the nature of our said invention and in what manner the same is to be performed, we declare that what we claim is:

1. An automatic soldering or welding machine for soldering or welding between metallic elements along their edges separated from each other by a gap and presented with both sides of each element free and arranged vertically in the part of the said edges which is submitted to the soldering or welding operation, the said machine comprising a blow-pipe, the axis of which is arranged in such a manner that the flame emerging from it keeps melted the upper part of the soldering or welding already made between the opposite edges of the elements to be soldered or welded and melts the upper adjacent part of each of the said opposed edges, a holder for an auxiliary metal soldering or welding piece, such as a wire, the said holder being arranged above the said blow-pipe in such a manner that the end of the said auxiliary metal soldering or welding piece is melted by the flame of the said blow-pipe and falls drop by drop in the soldering or welding bath formed at the upper part of the soldering or welding, means for feeding the said auxiliary metal piece through its holder, means for producing a relative circular movement between the blow-pipe and the said holder, the said means comprising a crank pin and a bearing mounted on the said crank pin and provided with a trunnion forming a support for the said auxiliary metal piece-holder, a guiding device for maintaining the axis of the said auxiliary metal piece-holder in a constant direction, the said guiding device consisting of a slide having two slide-ways at right angles to each other, one of these slide-ways receiving the trunnion of the bearing for supporting the auxiliary metal piece-holder and the other a stationary guide, a common member for supporting the blow-pipe, the members for producing the relative movement between the blow-pipe and the auxiliary metal piece holder and its guiding device and means for producing a relative vertical movement between the said common supporting member and the part of the edges of the elements which is, at that time, submitted to the soldering or welding operation, this latter relative movement being executed in the direction corresponding to the progress of the soldering or welding.

2. An automatic soldering or welding machine for soldering or welding between metallic elements along their edges separated from each other by a gap and presented with both sides of each element free and arranged vertically in the part of the said edges which is submitted to the soldering or welding operation, the said machine comprising a blow-pipe, the axis of which is arranged in such a manner that the flame emerging from it keeps melted the upper part of the soldering or welding already made between the opposite edges of the elements to be soldered or welded and melts the upper adjacent part of each of the said opposed edges, a holder for an auxiliary metal soldering or welding piece, such as a wire, the said holder being arranged above the said blow-pipe in such a manner that the end of the said auxiliary metal soldering or welding piece is melted by the flame of the said blow-pipe and falls drop by drop in the soldering or welding bath formed at the upper part of the soldering or welding, means for feeding the said auxiliary metal piece through its holder, the said means including a loose roller arranged on one side of the said auxiliary piece, a driving roller arranged on the opposite side of the said piece, a resilient member for pressing these two rollers against the said auxiliary piece to be fed and a telescopic driving shaft provided with a Cardan joint at each of its ends for the said driving roller, means for producing a relative circular movement between the blow-pipe and the said holder, a common member for supporting the blow-pipe, the holder and the members for producing the relative movement between the blow-pipe and the auxiliary metal piece holder, and means for producing a relative vertical movement between the said common supporting member and the part of the edges of the elements which is, at that time, submitted to the soldering or welding operation, this latter relative movement being executed in the direction corresponding to the progress of the soldering or welding.

3. An automatic soldering or welding machine for soldering or welding between metallic elements along their rectilinear edges separated from each other by a gap and presented with both sides of each element free and arranged vertically in the part of the said edges which is submitted to the soldering or welding operation, the said machine comprising a blow-pipe, the axis of which is arranged in such a manner that the flame emerging from it keeps melted the upper part of the soldering or welding already made between the opposite edges of the elements to be soldered or welded and melts the upper adjacent part of each of the said opposed edges, a holder for an auxiliary metal soldering or welding piece, such as a wire, the said holder being arranged above the said blow-pipe in such a manner that the end of the said auxiliary metal soldering or welding piece is melted by the flame of the said blow-pipe and falls drop by drop in the soldering or welding bath formed at the upper part of the soldering or welding, means for feeding the said auxiliary metal piece through its holder, means for producing a relative movement between the blow-pipe and the said solder, a platform for supporting the blow-pipe, the said holder and the members for producing the relative movement between the blow-pipe and the said holder, a second platform, means for producing a relative movement between the said first platform and said second platform for supporting the elements to be soldered or welded, such means comprising a driving screw having a vertical axis, a nut connected to one of said platforms and traversed by the said screw and means for driving the said screw in the direction corresponding to the progress of the soldering or welding.

4. An automatic soldering or welding machine for soldering or welding between metallic elements along their edges separated from each other by a gap and presented with both sides of each element free and arranged vertically in the part of the said edges which is submitted to the soldering or welding operation, the said machine comprising a blow-pipe, the axis of which is arranged in such a manner that the flame emerging from it keeps melted the upper part of the soldering or welding already made between the opposite edges of the elements to be soldered or welded and melts the upper adjacent part of each of the said opposed edges, a holder for an auxiliary metal soldering or welding piece, such as a wire, the said holder being arranged above the said blow-pipe in such a manner that the end of the said auxiliary metal soldering or welding piece is melted by the flame of the said blow-pipe and falls drop by drop in the soldering or welding bath formed at the upper part of the soldering or welding, means for feeding the said auxiliary metal piece through its holder, means for producing a relative movement between the blow-pipe and the said holder, a carriage for supporting the blow-pipe, the auxiliary metal piece-holder and the members for producing the relative movement between the blow-pipe and the auxiliary metal piece-holder, a platform for supporting the said carriage, means for adjusting the position of the blow-pipe on the said carriage in relation to the elements to be soldered or welded, the said means including a sleeve in which the said blow-pipe is mounted and an adjusting screw for the said sleeve, the said screw being parallel to the axis of the said sleeve and provided with a controlling head, and means for producing a relative vertical movement between the said platform and the part of the edges of the elements which is, at that time, submitted to the soldering or welding operation, this latter relative movement being executed in the direction corresponding to the progress of the soldering or welding.

5. An automatic soldering or welding machine for soldering or welding between metallic elements along their edges separated from each other by a gap and presented with both sides of each element free and arranged vertically in the part of the said edges which is submitted to the soldering or welding operation, the said machine comprising a blow-pipe, the axis of which is arranged in such a manner that the flame emerging from it keeps melted the upper part of the soldering or welding already made between the opposite edges of the elements to be soldered or welded and melts the upper adjacent part of each of the said opposed edges, a holder for an auxiliary metal soldering or welding piece, such as a wire, the said holder being arranged above the said blow-pipe in such a manner that the end of the said auxiliary metal soldering or welding piece is melted by the flame of the said blow-pipe and falls drop by drop in the soldering or welding bath formed at the upper part of the soldering or welding, means for feeding the said auxiliary metal piece through its holder, means for producing a relative movement between the blow-pipe and the said holder, a platform for supporting the blow-pipe, the auxiliary metal piece holder and the members for producing the relative movement between the blow-pipe and the auxiliary metal piece-holder, means for adjusting the inclination of the blow-pipe in relation to the elements to be soldered or welded, the said means including trunnions arranged on the blow-pipe and carried by bearings provided on the said platform, the said trunnions being provided with adjusting heads for adjusting them about their axis, and means for producing a relative vertical movement between the said platform and the part of the edges of the elements which is, at that time, submitted to the soldering or welding operation, this latter relative movement being executed in the direction corresponding to the progress of the soldering or welding.

6. An automatic soldering or welding machine for soldering or welding between metallic elements along their edges separated from each other by a gap and presented with both sides of each element free and arranged vertically in the part of the said edges which is submitted to the soldering or welding operation, the said machine comprising a blow-pipe, the axis of which is arranged in such a manner that the flame emerging from it keeps melted the upper part of the soldering or welding already made between the opposite edges of the elements to be soldered or welded and melts the upper adjacent part of each of the said opposed edges, a holder for an auxiliary metal soldering or welding piece, such as a wire, the said holder being arranged above the said blow-pipe in such a manner that the end of the said auxiliary metal soldering or welding piece is melted by the flame of the said blow-pipe and falls drop by drop in the soldering or welding bath formed at the upper part of the soldering or welding, means for feeding the said auxiliary metal piece through its holder, means for producing a relative circular movement between the blow-pipe and the said holder, the said means including a driving shaft provided with a crank pin, a bearing mounted on the said crank pin and serving as a support for the auxiliary metal piece holder, a platform for supporting the blow-pipe, the auxiliary metal piece-holder and the members for producing the relative movement between the blow-pipe and the auxiliary metal piece-holder, means for adjusting vertically the wire-holder above the blow-pipe, the said means including guides arranged on a bearing supporting a driving shaft for the wire holder, a guide arranged on the said bearing, a slide way for the said guide and an adjustable member for adjusting the position in height of the said bearing along the said slide way, and means for producing a relative vertical movement between the said platform and the part of the edges of the elements which is at that time, submitted to the soldering or welding operation, this latter relative movement being executed in the direction corresponding to the progress of the soldering or welding.

7. An automatic soldering or welding machine for soldering or welding between metallic elements along their edges separated from each other by a gap and presented with both sides of each element free and arranged vertically in the part of the said edges which is submitted to the soldering or welding operation, the said machine comprising a blow-pipe, the axis of which is arranged in such a manner that the flame emerging from it keeps melted the upper part of the soldering or welding already made between the opposite edges of the elements to be soldered or welded and melts the upper adjacent part of each of the said opposed edges, a holder for an auxiliary metal soldering or welding piece, such as a wire, the said holder being arranged above the said blow-pipe in such a manner that the end of the said auxiliary metal soldering or welding piece is melted by the flame of the said blow-pipe and falls drop by drop in the soldering or welding bath formed at the upper part of the soldering or welding, means for feeding the said auxiliary metal piece through its holder, means for producing a relative movement between the blow-pipe and the said holder, the said means including a driving shaft provided with a crank pin, a bearing mounted on the said crank pin and serving as a support for the auxiliary metal piece holder, a platform for supporting the blow-pipe, the auxiliary metal piece-holder and the members for producing the relative movement between the blow-pipe and the auxiliary metal piece-holder, means for adjusting the working inclination of the auxiliary metal piece holder in relation to the elements to be soldered or welded, the said means including a trunnion fixed to the bearing mounted on the crank pin, another bearing fixed to the auxiliary metal piece holder and mounted on the said trunnion and adjustable means for adjusting the said latter bearing in any angular desired position with reference to the other bearing and means for producing a relative vertical movement between the said platform and the part of the edges of the elements which is, at that time, submitted to the soldering or welding operation, this latter relative movement being executed in the direction corresponding to the progress of the soldering or welding.

8. An automatic soldering or welding machine for soldering or welding between metallic elements along their edges separated from each other by a gap and presented with both sides of each element free and arranged vertically in the part of the said edges which is submitted to the soldering or welding operation, the said machine comprising a blow-pipe the axis of which is arranged in such a manner that the flame emerging from it keeps melted the upper part of the soldering or welding already made between the opposite edges of the elements to be soldered or welded and melts the upper adjacent part of each of the said opposed edges, a holder for an auxiliary metal soldering or welding piece, such as a wire, the said holder being arranged above the said blow-pipe in such a manner that the end of the said auxiliary metal soldering or welding piece is melted by the flame of the said blow-pipe and falls drop by drop in the soldering or welding bath formed at the upper part of the soldering or welding, means for feeding the said auxiliary metal piece through its holder, means for producing a relative circular movement between the blow-pipe and the said holder, the said means including a telescopic driving shaft provided with a Cardan joint at each of its ends, a bearing for supporting the said shaft, the said bearing being provided with guides movable along slide-ways and with a member for adjusting the position in height of the said bearing relative to the blow-pipe, a crank-pin arranged on the said driving shaft and another bearing mounted on the said crank-pin and forming a support for the auxiliary metal piece holder, a platform for supporting the blow-pipe, the auxiliary metal piece-holder and the members for producing the relative movement between the blow-pipe and the auxiliary metal piece-holder, and means for producing a relative vertical movement between the platform and the part of the edges of the elements which is, at that time, submitted to the soldering or welding operation, this latter relative movement being executed in the direction corresponding to the progress of the soldering or welding.

9. An automatic soldering or welding machine for soldering or welding between metallic elements along their edges separated from each other by a gap and presented with both sides of each element free and arranged vertically in the part of the said edges which is submitted to the soldering or welding operation, the said machine comprising a blow-pipe the axis of which is arranged in such a manner that the flame emerging from it keeps melted the upper part of the soldering or welding already made between the opposite edges of the elements to be soldered or welded and melts the upper adjacent part of each of the said opposed edges, a holder for an auxiliary metal soldering or welding piece, such as a wire, the said holder being arranged above the said blow-pipe in such a manner that the end of the said auxiliary metal soldering or welding piece is melted by the flame of the said blow-pipe and falls drop by drop in the soldering or welding bath formed at the upper part of the soldering or welding, means for feeding the said auxiliary metal piece through its holder, the said means including a driving shaft of a driving roller arranged in front of a loose roller on the said holder with the auxiliary metal piece arranged between the said rollers, means for adjusting the rotary speed of the said driving shaft, the said means including a driving crank for the said driving shaft, a driving crank-pin for the said crank, a nut carrying the said crank-pin, a screw adjustable about its axis and carrying the said nut, the said screw being arranged on a driving rotary member with its axis passing through the center of the said driving rotary member, and means for producing a relative movement between the blow-pipe and the holder, a platform for supporting the blow-pipe, the auxiliary metal piece-holder and the members for producing the relative movement between the blow-pipe and the auxiliary metal piece-holder, means for producing a relative vertical movement between the said platform and the part of the edges of the elements which is, at that time, submitted to the soldering or welding operation, this latter relative movement being executed in the direction corresponding to the progress of the soldering or welding.

10. An automatic soldering or welding machine for soldering or welding between metallic elements along their edges separated from each other by a gap and presented with both sides of each element free and arranged vertically in the part of the said edges which is submitted to the soldering or welding operation, the said machine comprising a blow-pipe, the axis of which is arranged in such a manner that the flame emerging from it keeps melted the upper part of the soldering or welding already made between the opposite edges of the elements to be soldered or welded and melts the upper adjacent part of each of the said opposed edges, a holder for an auxiliary metal soldering or welding piece, such as a wire, the said holder being arranged above the said blow-pipe in such a manner that the end of the said auxiliary metal soldering or welding piece is melted by the flame of the said blow-pipe and falls drop by drop in the soldering or welding bath formed at the upper part of the soldering or welding, means for feeding the auxiliary metal piece through its holder, means for producing a relative movement between the blow-pipe and the said holder, a platform for supporting the blow-pipe, the auxiliary metal piece holder and the members for producing the relative movement between the blow-pipe and the auxiliary metal piece holder, means for producing a relative vertical movement between the said platform and the part of the edges of the elements which is, at that time, submitted to the soldering or welding operation, this latter relative movement being executed in the direction corresponding to the progress of the soldering or welding, and means for automatically stopping the said relative movement between the said platform and the elements to be soldered or welded, on the completion of the soldering or welding operation.

11. An automatic soldering or welding machine for soldering or welding between metallic elements along their edges separated from each other by a gap and presented with both sides of each element free and arranged vertically in the part of the said edges which is submitted to the soldering or welding operation, the said machine comprising a blow-pipe, the axis of which is arranged in such a manner that the flame emerging from it keeps melted the upper part of the soldering or welding already made between the opposite edges of the elements to be soldered or welded and melts the upper adjacent part of each of the said opposed edges, a holder for an auxiliary metal soldering or welding piece, such as a wire, the said holder being arranged above the said blow-pipe in such a manner that the end of the said auxiliary metal soldering or welding piece is melted by the flame of the said blow-pipe and falls drop by drop in the soldering or welding bath formed at the upper part of the soldering or welding, means for feeding the auxiliary metal piece through its holder, means for producing a relative movement between the blow-pipe and the said holder, a platform for supporting the blow-pipe, the auxiliary metal piece holder and the members for producing the relative movement between the blow-pipe and the said auxiliary metal piece holder, means for producing a relative vertical movement between the said common supporting member and the part of the edges of the elements which is, at that time, submitted to the soldering or welding operation, this latter relative movement being executed in the direction corresponding to the progress of the soldering or welding, a contact connected to one of the parts submitted to the said relative movement, another contact connected to the other part submitted to the said relative movement and cooperating with the first contact at the end of the soldering or welding operation and electrical means controlled by the said contacts for stopping the motor producing the relative movement between the platform and the soldered or welded elements on the completion of the soldering or welding operation.

12. An automatic soldering or welding machine for soldering or welding metallic elements along their edges separated from each other by a gap and presented vertically in the part of the said edges which is submitted to the soldering or welding operation, said opposed edges of the elements having a primary soldering or welding already made therebetween, the said machine comprising a blow-pipe, the axis of which is arranged in such a manner that the flame emerging from it keeps melted the upper part of the primary soldering or welding already made between the opposed edges of the elements to be soldered or welded and melts the upper adjacent part of each of the said opposed edges, a holder for an auxiliary metal soldering or welding piece, such as a wire, the said holder being arranged above the said blow-pipe in such a manner that the end of the said auxiliary metal soldering or welding piece is melted by the flame of the said blow-pipe and falls drop by drop in the soldering or welding bath formed at the upper part of the primary soldering or welding, means for feeding the said auxiliary metal piece through its holder, the said means including a driving shaft, a loose roller arranged on one side of the said auxiliary piece, a driving roller arranged on the opposite side of the said piece and an adjustable member for pressing these two rollers against the said auxiliary piece to be fed, means for producing a relative circular movement between the blow-pipe and the said holder the said means including a driving shaft provided with a crank pin, a bearing mounted on the said crank pin and provided with a trunnion serving as a support for the auxiliary metal piece holder, a guiding device for maintaining the axis of the said holder in a constant direction, this guiding device consisting of a slide having two slide-ways at right angles to each other, one of these slide-ways receiving the trunnion of the bearing of the auxiliary metal piece holder and the other a stationary guide, a common electric motor for operating the driving mechanism for feeding the auxiliary metal piece through its holder and the driving mechanism for producing a circular movement between the blow-pipe and the above holder, a common member for supporting the blow-pipe, the auxiliary metal piece holder and the members for producing the relative circular movement between the blow-pipe and the auxiliary metal piece holder, a second electric motor for producing a relative vertical movement between the said common supporting member and the part of the edges of the elements which is, at that time, submitted to the soldering or welding operation, this latter relative movement being executed in the direction corresponding to the progress of the soldering or welding, means for controlling the positions and inclinations of the blow-pipe and the holder in relation to each other and to the elements to be soldered or welded, and means for controlling the driving member for the feeding of the auxiliary metal piece through its holder.

ALFRED AUGUSTE
ADOLPHE ROSSIGNOL.
ALEXIS EUGÈNE QUATREMAINS.
AUGUSTE LOUIS ROSSIGNOL.